(12) United States Patent  (10) Patent No.: US 9,423,785 B2
Tezuka et al.  (45) Date of Patent: Aug. 23, 2016

(54) TOOL TRAJECTORY DISPLAY DEVICE HAVING FUNCTION FOR DISPLAYING INVERSION POSITION OF SERVO AXIS

(71) Applicant: FANUC CORPORATION, Minamitsuru-gun, Yamanashi (JP)

(72) Inventors: Junichi Tezuka, Yamanashi (JP); Hajime Ogawa, Yamanash (JP)

(73) Assignee: FANUC CORPORATION, Yamanashi (JP)

( * ) Notice: Subject to any disclaimer, the term of this patent is extended or adjusted under 35 U.S.C. 154(b) by 506 days.

(21) Appl. No.: 14/050,063

(22) Filed: Oct. 9, 2013

(65) Prior Publication Data

US 2014/0100688 A1  Apr. 10, 2014

(30) Foreign Application Priority Data

Oct. 10, 2012 (JP) ................................ 2012-225003

(51) Int. Cl.
*G06F 19/00* (2011.01)
*G05B 19/404* (2006.01)
*G05B 19/409* (2006.01)

(52) U.S. Cl.
CPC ............ *G05B 19/404* (2013.01); *G05B 19/409* (2013.01); *G05B 2219/36171* (2013.01)

(58) Field of Classification Search
CPC ............... G05B 19/404; G05B 19/409; G05B 2219/36171
USPC .................... 700/180–186; 318/601; 606/130; 702/41, 141, 152
See application file for complete search history.

(56) References Cited

U.S. PATENT DOCUMENTS 8,896,255 B2 * 11/2014 Iwashita .............. G05B 11/011 318/280

| 2003/0216830 | A1 | 11/2003 | Hasebe et al. | |
| 2006/0186849 | A1 * | 8/2006 | Iwashita | G05B 19/406 318/576 |
| 2011/0015877 | A1 * | 1/2011 | Okita | G05B 19/409 702/41 |
| 2011/0202167 | A1 * | 8/2011 | Iwashita | G05B 19/404 700/187 |
| 2011/0270270 | A1 * | 11/2011 | Vancamberg | A61B 19/50 606/130 |

FOREIGN PATENT DOCUMENTS

| JP | 2004-021954 A | 1/2004 |
| JP | 2011165066 A | 8/2011 |
| JP | 2011-170584 A | 9/2011 |

OTHER PUBLICATIONS

Office Action mailed Jun. 3, 2014, corresponds to Japanese patent application No. 2012-225003.

* cited by examiner

*Primary Examiner* — Mohammad Ali
*Assistant Examiner* — Ziaul Karim
(74) *Attorney, Agent, or Firm* — Hauptman Ham, LLP

(57) ABSTRACT

A tool trajectory display device capable of displaying an inversion position of a servo axis on a tool trajectory. The display device has a position information obtaining part and velocity information obtaining part which obtain position information and velocity information of at least one servo axis, respectively, from numerical controller; a tool coordinate calculating part which calculates a coordinate value of a tool center point based on the position information and information of a mechanical constitution of the machine tool; an inversion position calculating part which calculates an inversion position where a polarity of a velocity of the servo axis is changed, based on the velocity information and the calculated coordinate value; and a displaying part which displays a trajectory of the tool center point based on the calculated coordinate, and displays the inversion position of the servo axis on the trajectory.

4 Claims, 4 Drawing Sheets

(a)　　　　　　　(b)

(a)　　　(b)　　　(c)

TOOL TRAJECTORY DISPLAY DEVICE HAVING FUNCTION FOR DISPLAYING INVERSION POSITION OF SERVO AXIS

RELATED APPLICATIONS

The present application is based on, and claims priority from, Japanese Application No. 2012-225003, filed Oct. 10, 2012, the disclosure of which is hereby incorporated by reference herein in its entirety.

BACKGROUND OF THE INVENTION

1. Field of the Invention

The present invention relates to a tool trajectory display device having a function for displaying an inversion position of a servo axis.

2. Description of the Related Art

Generally, in a machine tool wherein processing is carried out by an interpolating operation due to a plurality of servo axes, it is likely that a shape error between a commanded shape and a processed shape may increase at an inversion position where the polarity (or sign) of each axis is inverted. As a factor thereof, mechanical play (for example, a backlash in a ball screw), and a delay in response of a servo due to a change in a direction of friction, etc., can be cited. In such a case, the shape error may be decreased by correcting the position and/or acceleration of each axis, and by performing servo adjustment such as gain adjustment.

For example, Japanese Unexamined Patent Publication (Kokai) No. 2004-021954 discloses a method for displaying a tool trajectory of NC data for processing a workpiece by using micro line segments of three (X, Y and Z) axes, wherein the tool trajectory is displayed as a set of the line segments or end points of the line segments. Concretely, this document describes that an inclination (plus, minus or zero) of each line segment relative to a specified axis is judged, and then a display attribute of the line segment is changed depending on the result of judgment, whereby a concave or convex shape in the tool trajectory can be easily determined.

Further, Japanese Unexamined Patent Publication (Kokai) No. 2011-170584 discloses a numerical controller, wherein a coordinate of a tool center point is calculated from a coordinate of each drive axis at each time point, a tool radius correction vector extending between the tool center point and an actual machining point is determined, a coordinate of the actual machining point is calculated, and a trajectory of the actual machining point is displayed.

In the prior art, in a machine tool constituted by only linear axes, it is easy to associate the inversion position of each axis with the processed shape. However, in a machine tool including a rotation axis, such as a five-axis machine tool, it is not easy to do so. Therefore, it is difficult to properly adjust a servo since it cannot be clearly determined whether the shape error depends on the inversion motion of the servo axis or the other factor.

For example, in Japanese Unexamined Patent Publication (Kokai) No. 2004-021954, a tool trajectory is displayed based on NC data generated by a CAD/CAM. However, since a commanded trajectory of the NC and an actual trajectory of the tool center point are not displayed, the proper servo adjustment cannot be carried out. Further, in a constitution having two or more axes including a rotation axis, coordinate conversion is necessary to represent a coordinate of the tool center point in a coordinate system of three linear axes (X, Y and Z). Since a plurality of variables relate to components of X, Y and Z axes after the coordinate conversion, the inversion position of each axis cannot be found based on inclinations of the three-axis micro line segments of X, Y and Z relative to the specified axis.

On the other hand, in Japanese Unexamined Patent Publication (Kokai) No. 2011-170584, although a trajectory of actual process points can be displayed by taking the tool radius correction vector into consideration, the inversion position of each axis is not displayed on the tool trajectory. Therefore, it is difficult to clearly determine whether the shape error depends on a change in the polarity of the servo axis or another factor.

SUMMARY OF THE INVENTION

An object of the present invention is to provide a tool trajectory display device capable of displaying the inversion position of the servo axis on the tool trajectory.

According to the present invention, there is provided a tool trajectory display device for displaying a trajectory of a tool center point of a machine tool with a plurality of servo axes including at least one rotation axis controlled by a numerical controller, the tool trajectory display device comprising: a position information obtaining part which obtains position information of at least one of the servo axes; a velocity information obtaining part which obtains velocity information of the servo axis; a tool coordinate calculating part which calculates a coordinate value of the tool center point based on the position information of the servo axis and information of a mechanical constitution of the machine tool; an inversion position calculating part which calculates an inversion position where a polarity of a velocity of at least one servo axis is changed, based on the velocity information of the servo axis and the coordinate value of the tool center point; and a displaying part which displays a trajectory of the tool center point based on the coordinate value of the tool center point, and displays the inversion position of the servo axis on the trajectory of the tool center point.

In a preferred embodiment, the displaying part simultaneously displays the inversion positions of the plurality of servo axes on the trajectory of the tool center point.

In a preferred embodiment, the displaying part displays an inversion position where the polarity of the velocity of the servo axis is changed from plus to minus and an inversion position where the polarity of the velocity of the servo axis is changed from minus to plus, by using marks with different shapes.

In a preferred embodiment, the displaying part changes a display attribute of the trajectory of the tool center point based on the polarity of the velocity of the servo axis.

In a preferred embodiment, the displaying part displays an arrow, a sign or a character which represents the inversion position.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
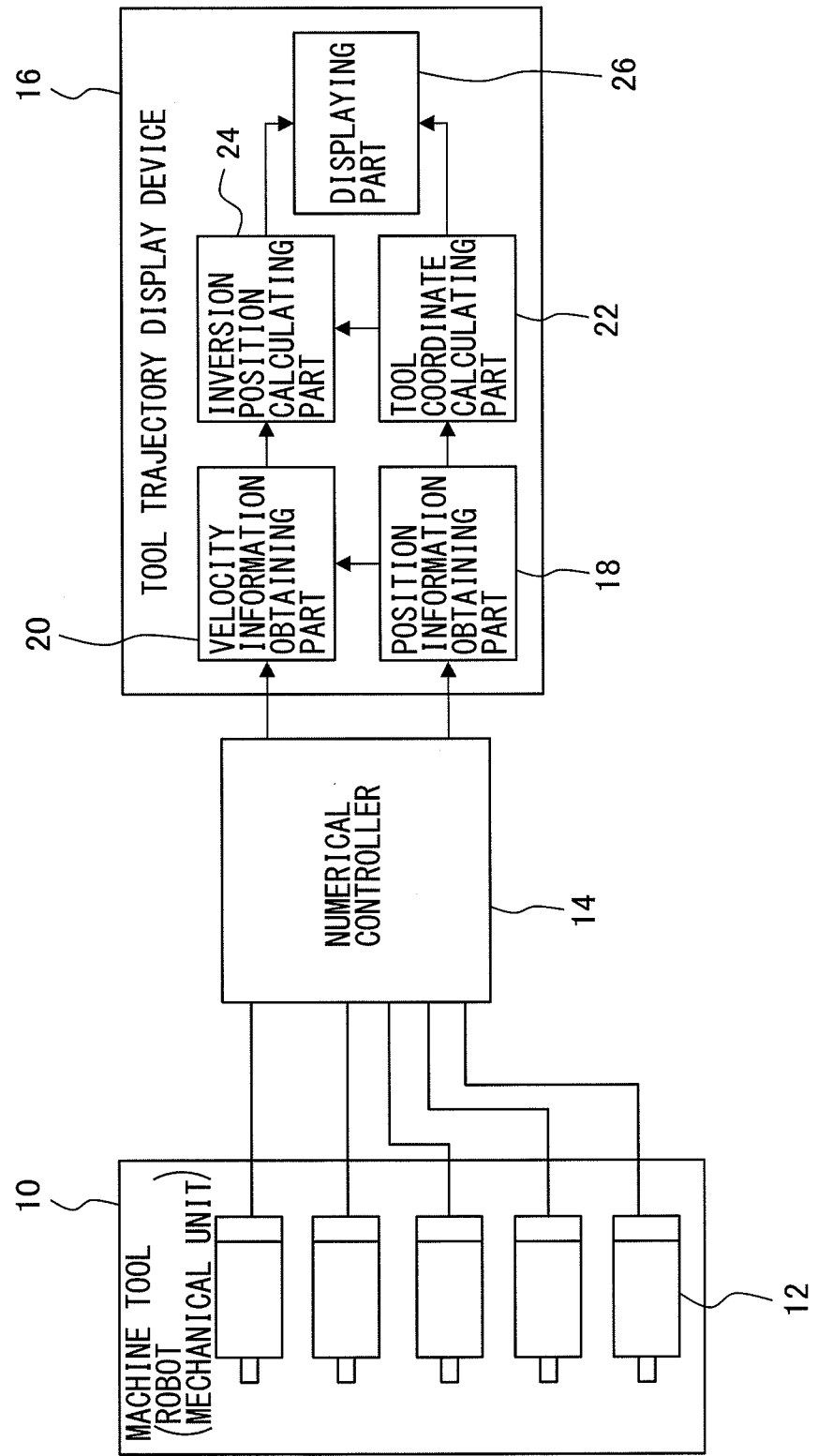
FIG. 1 is a block diagram showing a configuration example of a system including a tool trajectory display device according to an embodiment of the present invention.

FIG. 1 is a block diagram showing a configuration example of a system including a tool trajectory display device according to the present invention. A machine tool (mechanical unit) 10 has a plurality of (five in the illustrated embodiment) servo axes (or drive axes) 12 including at least one rotation axis, and each servo axis 12 is controlled by a numerical controller (CNC) 14 based on a predetermined position command. A tool trajectory display device 16 has a position information obtaining part 18 which obtains position information of at least one servo axis 12 from numerical controller 14; a velocity information obtaining part 20 which obtains velocity information of at least one servo axis 12 from numerical controller 14; a tool coordinate calculating part 22 which calculates a coordinate value of a center point of a tool (or a tool center point) based on the obtained position information of servo axis 12 and information of a mechanical constitution (for example, a dimension of each component thereof) of machine tool 10; an inversion position calculating part 24 which calculates an inversion position where a polarity of a velocity of servo axis 12 is changed, based on the obtained velocity information of servo axis 12 and the coordinate value of the tool center point; and a displaying part 26 which displays a trajectory of the tool center point based on the coordinate value of the tool center point, and displays the inversion position of servo axis 12 on the trajectory of the tool center point.

Although position information obtaining part 18 and velocity information obtaining part 20 may obtain the position information and the velocity information from numerical controller 14, respectively, the position information and velocity information may be obtained from a position detector and a velocity detector (not shown), such as an encoder, which measures the position and the velocity of each axis 12. Further, velocity information obtaining part 20 may obtain, as the velocity information, a calculation result of the position information obtained by position information obtaining part 18.

Figure 2:
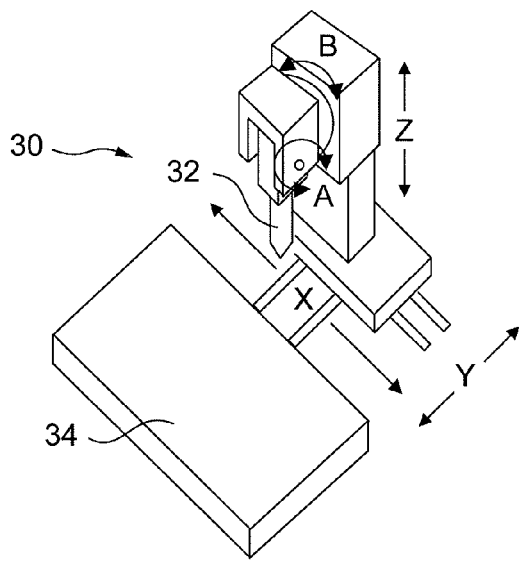
FIG. 2 is a perspective view of a five-axis processing machine which is one example of a machine tool to which the present invention can be applied.

FIG. 2 schematically shows a five-axis processing machine 30 which is one example of the machine tool to which the present invention can be applied. Five-axis processing machine 30 is a processing machine with a rotating tool-head, and includes three linear axes (X-, Y- and Z-axes) orthogonal to each other and two rotation axes (A- and B-axes) orthogonal to each other, wherein a workpiece (not shown) on a table 34 can be processed by means of a tool 32.

Figure 3:
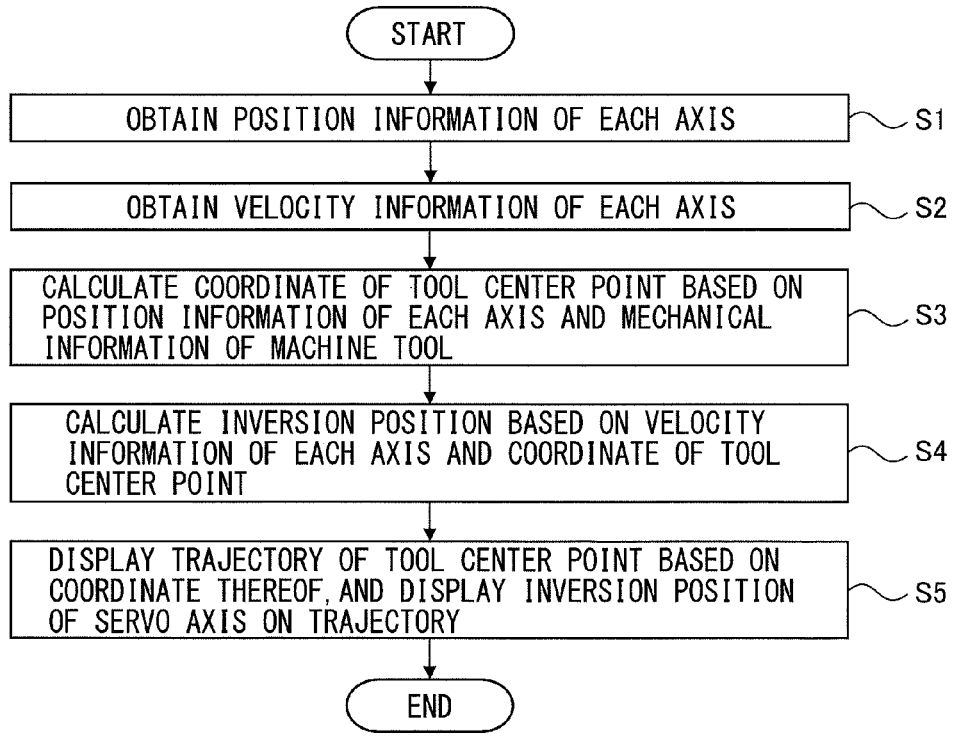
FIG. 3 is a flowchart indicating one example of the procedure of the tool trajectory display device of the invention.

Next, the procedure and function of tool trajectory display device 16 will be explained, when five-axis processing machine 30 of FIG. 2 is used, with reference to the flowchart in FIG. 3. First, in step S1, position information obtaining part 18 obtains position information of each axis from numerical controller 14 for controlling servo axes 12. The position information may include a position command from numerical controller 14 to each servo axis 12, and an actual position of each axis 12 driven by the position command.

In the next step S2, velocity information obtaining part 20 obtains velocity information of each axis 12 from numerical controller 14. The velocity information may include a velocity command from numerical controller 14 to each servo axis 12, an actual velocity of each axis 12 driven by the velocity command, and a velocity calculated from the position information of each axis 12.

In the next step S3, tool coordinate calculating part 22 calculates a coordinate of the tool center point based on the position information and the information of the mechanical constitution of the machine tool. For example, in the case of five-axis processing machine as shown in FIG. 2, when coordinates of the five axes (X-, Y-, Z-, A- and B-axes) at a time point "t" are referred to as x(t), y(t), z(t), a(t) and b(t), respectively, and an intersection point, between two rotation axes respectively corresponding to rotational centers of A- and B-axes, is referred to as "M," a coordinate of point "M" is represented as (x(t), y(t), z(t)), wherein an origin is appropriately determined in view of a coordinate system fixed to a workpiece to be processed.

In this regard, when a length from point M to the tool center point is referred to as "L," and a position where the tool faces directly downwardly is referred to as a reference position (or the origin) of A- and B-axes, a coordinate (Pos X, Pos Y, Pos Z) of the tool center point is calculated by the following equations.

$Pos\ X = x(t) + L \cdot \cos(a(t)) \cdot \sin(b(t))$ $Pos\ Y = y(t) + L \cdot \sin(a(t))$ $Pos\ Z = z(t) - L \cdot \cos(a(t)) \cdot \cos(b(t))$ In the next step S4, inversion position calculating part 24 calculates the position of the tool center point where a polarity (or a sign of the velocity) of servo axis 12 is inverted. In this regard, the position where the polarity is inverted (or the inversion position) means the position, such as a position 38 on a trajectory 36 exemplified in FIG. 4, where the velocity of each axis is changed from plus (+) to minus (−) via zero, or from minus (−) to plus (+) via zero.

Figure 4:
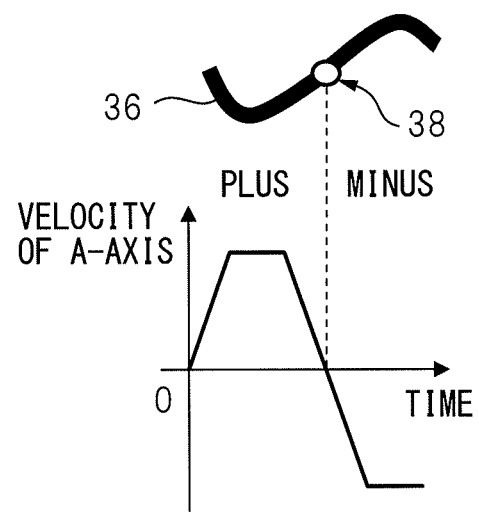
FIG. 4 is a diagram showing the relationship between a trajectory of a tool center point and an axis velocity.

Finally, in step S5, displaying part 26 displays the trajectory of the tool center point based on the coordinate value of the tool center point, and also displays the inversion position of the servo axis on the trajectory. In the example of FIG. 4, inversion position 38 where the velocity of A-axis is changed from plus to minus is displayed on trajectory 36 of the tool center point, by using a generally circular mark.

Figure 5:
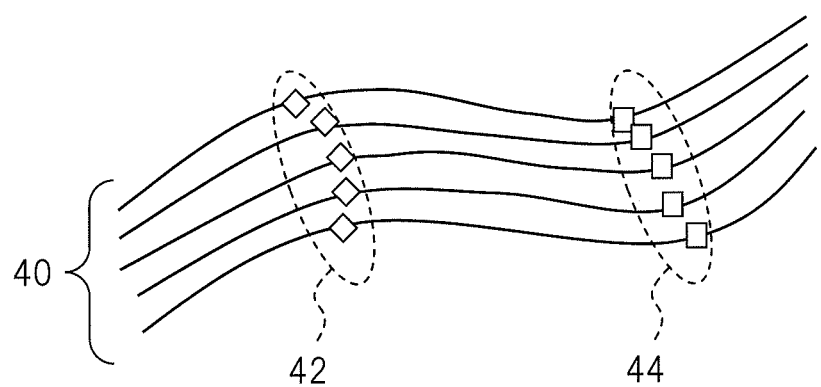
FIG. 5 is a diagram showing an example wherein inversion positions of a plurality of servo axes are simultaneously displayed on the trajectory.

Hereafter, various representations of the trajectory and the inversion position displayed by displaying part 26 will explained, with reference to FIGS. 5 to 8. First, FIG. 5 shows an example wherein inversion positions of a plurality of servo axes are simultaneously displayed on the trajectory of the tool center point. In the example of FIG. 5, on a trajectory 40 of the tool center point, an inversion position 42 of the velocity of X-axis and an inversion position 44 of the velocity of B-axis are displayed, wherein the shapes of marks representing the inversion positions are different with respect to the axes so as to easily discriminate as to which axis is inverted at the inversion position. Further, in the example of FIG. 5, the trajectory of the tool center point is gradually shifted since the tool gradually cuts deeper into the workpiece due to reciprocating motion of the tool, etc., in a normal processing. By virtue of this, if a final shape of the machined workpiece has an error, it is easy to visually discriminate which servo axis is inverted when the error occurs.

Figure 6:
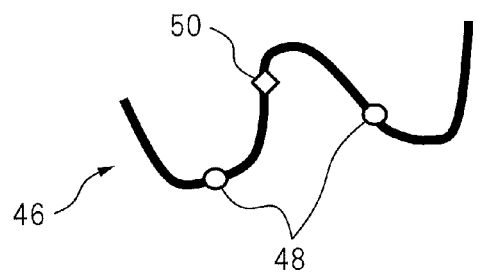
FIG. 6 is a diagram showing an example wherein marks having different shapes are used for displaying an inversion position where a polarity of a velocity of the servo axis is changed from plus to minus and an inversion position where the polarity of the velocity of the servo axis is changed from minus to plus.

FIG. 6 shows an example wherein marks with different shapes are used to represent an inversion position where the polarity of the velocity of the servo axis is changed from plus to minus and an inversion position where the polarity of the velocity of the servo axis is changed from minus to plus, so that these inversion positions can be discriminated from each other. Concretely, in a trajectory 46 of the tool center point as shown in FIG. 6, then inversion position where the polarity of the velocity of the servo axis is changed from plus to minus is indicated by a circular mark 48, and the inversion position where the polarity of the velocity of the servo axis is changed from minus to plus is indicated by a rectangular mark 50. By virtue of this, in a case of a gravity axis, for example, it can be easily determined whether the moving direction of the gravity axis is changed from upward to downward or vice versa, whereby the effect of the gravity on the shape error of the workpiece may be easily evaluated.

Figure 7:
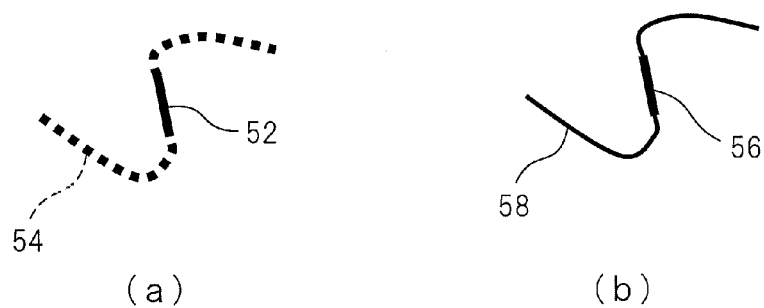
FIG. 7 is a diagram showing an example wherein a display attribute of the trajectory of the tool center point is changed based on the polarity of the velocity of the servo axis.

FIG. 7 shows an example wherein a display attribute of the trajectory of the tool center point is changed based on the polarity of the velocity of the servo axis (i.e., the display attribute is changed before and after the inversion position). A section (a) of FIG. 7 shows an example wherein a line type is changed, and a section (b) of FIG. 7 shows an example wherein a thickness of a line is changed. Concretely, in section (a) of FIG. 7, a solid line 52 is used when the velocity of the servo axis is minus, and a dashed line 54 is used when the velocity of the servo axis is plus. On the other hand, in section (b) of FIG. 7, a thick line 56 is used when the velocity of the servo axis is minus, and a thin line 58 is used when the velocity of the servo axis is plus. By virtue of this, the position where the velocity is inverted can be easily identified.

Although not shown, as another example wherein the display attribute is changed, a color of the trajectory may be changed depending on the polarity (plus or minus) of the velocity of the servo axis. For example, in displaying the trajectory, by using red when the axis velocity is minus and by using blue when the axis velocity is plus, the position where the velocity is inverted can be easily identified.

Figure 8:
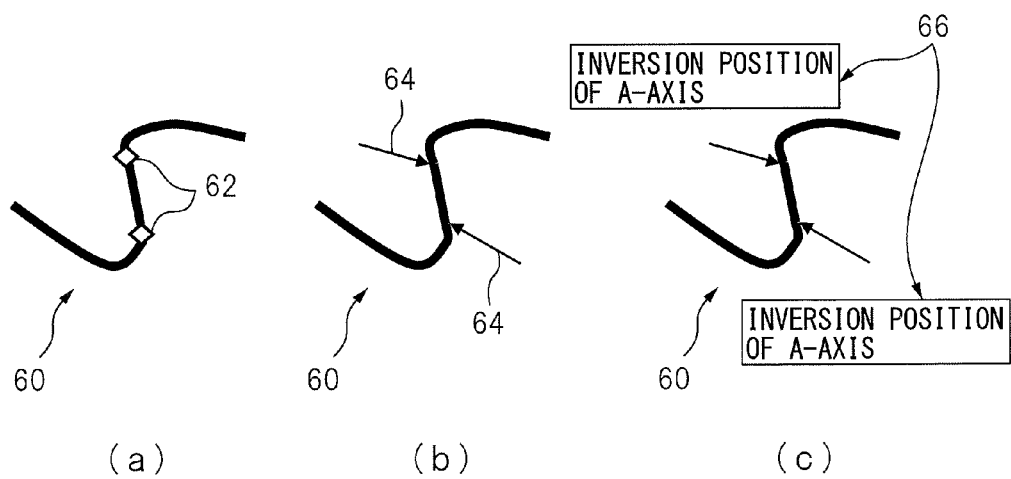
FIG. 8 is a diagram showing an example wherein the inversion position of the velocity of the servo axis is emphasized and displayed by using a marker, an arrow or a character.

FIG. 8 shows an example wherein the inversion position of the velocity of the servo axis is emphasized. Concretely, a section (a) of FIG. 8 shows an example wherein the inversion position on a trajectory 60 is indicated by a circular or rectangular mark 62, a section (b) of FIG. 8 shows an example wherein the inversion position is pointed by an arrow 64, and a section (c) of FIG. 8 shows an example wherein the inversion position is pointed by a sign or a character 66, instead of or in addition to the arrow. In each example, the position where the velocity is inverted can be easily identified.

The examples of FIGS. 5 to 8 may be properly combined. For example, the display attribute (the color and/or line type) of the trajectory may be changed depending on the polarity of the velocity, while indicating the inversion position by using the mark or the arrow.

According to the tool trajectory display device of the invention, for example, when the inversion position of a certain axis is correlated with the position of a workpiece where a shape error after the processing is relatively large, processing accuracy can be improved by adjusting or correcting a backlash (or a mechanical play) and/or an inversion delay of the axis. In a processing machine constituted by linear axes only, it is relatively easy to associate the inversion position of each axis with the processed shape. However, in a processing machine having many axes including a rotation axis, such as the five-axis processing machine according to the embodiment of the invention, it is difficult to associate the inversion position of each axis with the processed shape. Due to the invention, even in such a case, it is easy to specify a servo axis which should be adjusted.

According to the invention, by displaying the inversion position where the polarity of the velocity waveform of each axis is changed on the tool trajectory, it becomes easy to associate the inversion position of each axis with the position on the tool trajectory, whereby servo adjustment can be effectively carried out.

By simultaneously displaying the inversion positions of the plurality of servo axes on the trajectory of the tool center point, it is easy to visually discriminate which servo axis mainly effects on the error of the tool trajectory.

By displaying an inversion position where the polarity of the velocity of the servo axis is changed from plus to minus and an inversion position where the polarity of the velocity of the servo axis is changed from minus to plus, by using marks with different shapes, the motion of the servo axis can be accurately determined.

By properly changing a display attribute of the tool trajectory, or by indicating the inversion position by means of an arrow and/or the character, the position where the velocity is inverted can be easily observed.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A tool trajectory display device for displaying a trajectory of a tool center point of a machine tool with a plurality of servo axes including at least one rotation axis controlled by a numerical controller, the tool trajectory display device comprising:
    a position information obtaining part which obtains position information of at least one servo axis of the plurality of servo axes, by using a position detector which measures the position of the at least one servo axis;
    a velocity information obtaining part which obtains velocity information of the at least one servo axis, by calculating the velocity information based on the position information obtained by the position information obtaining part or by using a velocity detector which measures a velocity of the at least one servo axis;
    a tool coordinate calculating part which calculates a coordinate value of the tool center point based on the position information of the at least one servo axis and information of a mechanical constitution of the machine tool;
    an inversion position calculating part which calculates a plurality of inversion positions based on the velocity information of the at least one servo axis and the coordinate value of the tool center point, the plurality of inversion positions including
        a first inversion position where a polarity of the velocity of the at least one servo axis is changed from plus to minus, and
        a second inversion position where the polarity of the velocity of the at least one servo axis is changed from minus to plus; and
    a displaying part which
        displays a trajectory of the tool center point based on the coordinate value of the tool center point, and displays the plurality of inversion positions of the at least one servo axis on the trajectory of the tool center point, wherein the plurality of servo axes includes a gravity axis, and the displaying part displays the first and second inversion positions by using different display attributes, respectively, to indicate whether a moving direction of the gravity axis is changed from upward to downward or from downward to upward, for evaluating an effect of gravity on a shape error of a workpiece to be processed by the machine tool.

2. The tool trajectory display device as set forth in claim 1, wherein the displaying part simultaneously displays the inversion positions of the plurality of servo axes on the trajectory of the tool center point.

3. The tool trajectory display device as set forth in claim 1, wherein the displaying part changes a display attribute of the trajectory of the tool center point based on the polarity of the velocity of the at least one servo axis.

4. The tool trajectory display device as set forth in claim 1, wherein the displaying part displays an arrow, a sign or a character which represents each of the plurality of inversion positions.

\* \* \* \* \*